United States Patent [19]
Holden

[11] Patent Number: 5,592,522
[45] Date of Patent: Jan. 7, 1997

[54] CONTROL ROD FOR A NUCLEAR REACTOR

[75] Inventor: James E. Holden, Wilmington, N.C.

[73] Assignee: General Electric Company, Schenectady, N.Y.

[21] Appl. No.: 489,130

[22] Filed: Jun. 9, 1995

[51] Int. Cl.[6] ............................................. G21C 7/10
[52] U.S. Cl. ............................................. 376/333; 376/327
[58] Field of Search ........................... 376/327, 333, 376/328, 331

[56] References Cited

U.S. PATENT DOCUMENTS

| | | | |
|---|---|---|---|
| 2,855,354 | 10/1958 | Anderson | 376/328 |
| 3,448,008 | 6/1969 | Hellman | 376/333 |
| 3,624,241 | 11/1971 | Power | 376/328 |
| 4,581,201 | 4/1986 | Haggstrom et al. | 376/333 |
| 4,631,165 | 12/1986 | Wilson et al. | 376/333 |
| 4,752,440 | 6/1988 | Ahlinder et al. | 376/333 |
| 4,762,672 | 8/1988 | Kurihara et al. | 376/333 |
| 4,853,176 | 8/1989 | Charnley et al. | 376/333 |
| 4,861,544 | 8/1989 | Gordon | 376/333 |
| 4,882,123 | 11/1989 | Cearley et al. | 376/333 |
| 4,925,620 | 5/1990 | Aiello et al. | 376/260 |
| 4,980,535 | 12/1990 | Aiello et al. | 219/121.63 |
| 4,992,225 | 2/1991 | Van Diemen et al. | 264/65 |
| 5,034,185 | 7/1991 | Ueda et al. | 376/333 |
| 5,139,735 | 8/1992 | Dillmann et al. | 376/328 |
| 5,225,151 | 7/1993 | Bernander et al. | 376/333 |

FOREIGN PATENT DOCUMENTS

| | | | |
|---|---|---|---|
| 0285380 | 10/1988 | European Pat. Off. | 376/333 |
| 0129794 | 11/1978 | Japan | 376/333 |
| 0136680 | 8/1984 | Japan | 376/333 |
| 0170790 | 9/1985 | Japan | 376/333 |
| 0220893 | 11/1985 | Japan | 376/333 |
| 1304392 | 12/1989 | Japan | 376/327 |

*Primary Examiner*—Harvey E. Behrend
*Attorney, Agent, or Firm*—Nixon & Vanderhye

[57] ABSTRACT

A generally cruciform-shaped control rod for a nuclear reactor is formed by vertical stiffeners laterally spaced one from the other and interconnected by horizontal stiffeners at their ends defining discrete compartments in each wing of the cruciform-shaped control rod. Sheathing overlies the stiffeners to seal each of the compartments from its surrounding environment. Neutron-absorbing material, such as boron carbide and/or hafnium tubes, are disposed in each compartment. Each wing is secured to a generally cruciform central tie rod formed of planar plates superposed one over the other alternately at right angles with the outer edges of the plates welded to the inner edges of the wings, affording structural support to the control rod. The innermost vertically extending stiffeners have apertures communicating between adjacent compartments whereby helium gas generated by the boron-neutron reaction in the boron capsules leaks from the boron capsules into each compartment thereby equalizing the pressure across each wing of the control rod.

12 Claims, 4 Drawing Sheets

CONTROL ROD FOR A NUCLEAR REACTOR

TECHNICAL FIELD

The present invention relates to a control rod for a nuclear reactor and particularly to a cruciform-shaped control rod having each wing divided into discrete compartments formed by structural stiffeners and which compartments contain neutron-absorbing material.

BACKGROUND

As well known, control rods in a nuclear reactor perform the functions of power distribution, shaping and reactivity control. This is accomplished generally by providing a plurality of control rods containing material for neutron absorption and manipulating the control rods within the reactor. Generally, a control rod used in a boiling water reactor (BWR) is provided in a cruciform shape and extends in complementary cruciform-shaped interstices between fuel channels. While there are a number of different control rod designs, two basic control rod designs have been typically employed previously in boiling water reactors. In one design, each control rod consists of a plurality, e.g., either 48 or 84, boron carbide absorber or hafnium rods, or a combination of boron carbide and hafnium rods, separated into four cruciform-shaped wings of either 12 or 21 tubes each. The tubes are enclosed in a perforated outer sheath which is welded to a full-length central tie rod which has a handle and connector/velocity limiter at the respective opposite ends of the rod. The perforated sheath affords a cooling medium to the tubes. If a tube fails in this design, the boron carbide powder is exposed to the reactor coolant.

In another type of control rod, essentially square tubes are welded to one another to form the four wings of the cruciform-shaped control rods. Each wing contains 12 to 15 square tubes welded to one another and to a handle at one end and a connector/velocity limiter at the opposite end. The welds between the tubes and the tubes themselves provide the structural support for the control rod. The tubes serve as individual pressure vessels, as well as structural members subjected to all reactor induced loadings. In this design, the boron carbide powder is contained in sealed capsules inserted into the individual square tubes. One of the difficulties with the latter type of control rod construction is the magnitude of the welding required to weld each of the individual square tubes to an adjacent tube to provide the structural support necessary for the four wings of the control rod. While that construction has served well, it is quite expensive to manufacture.

Another problem associated with the design of control rods is that the reaction of the neutron-absorbing material, e.g., boron carbide, with neutrons produces a helium gas. Thus, the tubes of each of the previously noted designs must have structural integrity to maintain the generated helium gas within the tube at increasing pressure throughout the lifetime of the control rod. It is known that the mechanical lifetime of a control rod is limited by the reactor burn-up and the corresponding helium pressure build-up in the tube containing the boron carbide exposed to the highest neutron flux. The magnitude and pressure of helium gas generated depends on the location of the tube within the control rod. That is, the boron carbide containing tube which has the highest exposure to neutrons in the control rod determines the mechanical life of the control rod. However, in each prior design, the neutron-absorbing material was contained in discrete tubes individually subjected to helium gas pressure build-up and without any relief. Consequently, the life of the control rod is dependent upon the structural integrity of only one of a large number of absorber tubes.

DISCLOSURE OF THE INVENTION

In accordance with the present invention, there is provided a control rod construction which requires considerably reduced manufacturing time and expense as compared with prior control rod designs, principally by reducing the amount of welding required to form the control rod. Additionally, the invention extends the mechanical life of the control rod by equalization of the pressures within the absorber tubes across each wing of the control rod, hence limiting the helium gas pressure within the control rod to an average pressure of the individual absorber tubes. Particularly, the present invention provides a control rod in cruciform shape wherein each wing of the cruciform-shaped control rod includes discrete compartments sealed from the surrounding environment. For example, each wing of the cruciform-shaped control rod includes laterally spaced, vertically extending structural or stiffening members interconnected at their opposite ends by generally horizontally extending structural or stiffening members defining a plurality of compartments. Neutron-absorbing material is disposed in each of the compartments. For example, hafnium rods or capsules containing boron carbide, or a combination of hafnium rods and boron carbide capsules, may be disposed in each of the compartments. The compartments are sealed on opposite sides by overlays of sheet metal secured to the vertical and horizontally extending stiffening members, thus sealing the compartments from the surrounding environment.

In another aspect of the present invention, the compartments in each wing of the cruciform-shaped control rod communicate one with the other to afford an equalization of pressure within the entire wing of the control rod. More particularly, the capsules containing the boron carbide are designed to leak the helium generated by the boron-neutron reaction into the compartments. By providing openings or passages through the vertical members or stiffeners defining adjacent compartments, the helium leakage migrates between compartments, equalizing the pressure. As a consequence, variations in the generation of helium gas in the individual boron carbide capsules can be accommodated, thus extending the mechanical life of the control rod by providing an average pressure for all of the boron carbide capsules.

In a preferred embodiment according to the present invention, there is provided a control rod for a nuclear reactor, comprising a cruciform control rod body having four elongated, substantially vertically extending wings arranged generally 90° relative to one another, each wing including a plurality of elongated, generally vertically extending structural members spaced from one another and horizontally extending structural members adjacent opposite ends of the vertically extending members defining a plurality of vertically extending, side-by-side compartments, a sheath disposed along opposite sides of the vertically and horizontally extending members whereby the members and the sheath seal the compartments externally of the wing and a neutron-absorbing material disposed in each sealed compartment.

In a further preferred embodiment according to the present invention, there is provided a control rod for a nuclear reactor comprising a control rod body having a plurality of elongated, laterally spaced, generally parallel structural members in part defining a plurality of side-by-side sealed compartments each containing neutron-absorbing material, and an opening in at least one of the members in part defining adjacent compartments enabling passage of gas under pressure generated by reaction of the neutron-absorbing material with neutrons from one of the adjacent compartments through the opening to another of the adjacent compartments to maintain the adjacent compartments under substantially equal pressure.

Accordingly, it is a primary object of the present invention to provide a novel and improved control rod which can be readily, easily and inexpensively manufactured and which may extend the mechanical life of the control rod.

BEST MODE FOR CARRYING OUT THE INVENTION

Figure 1:
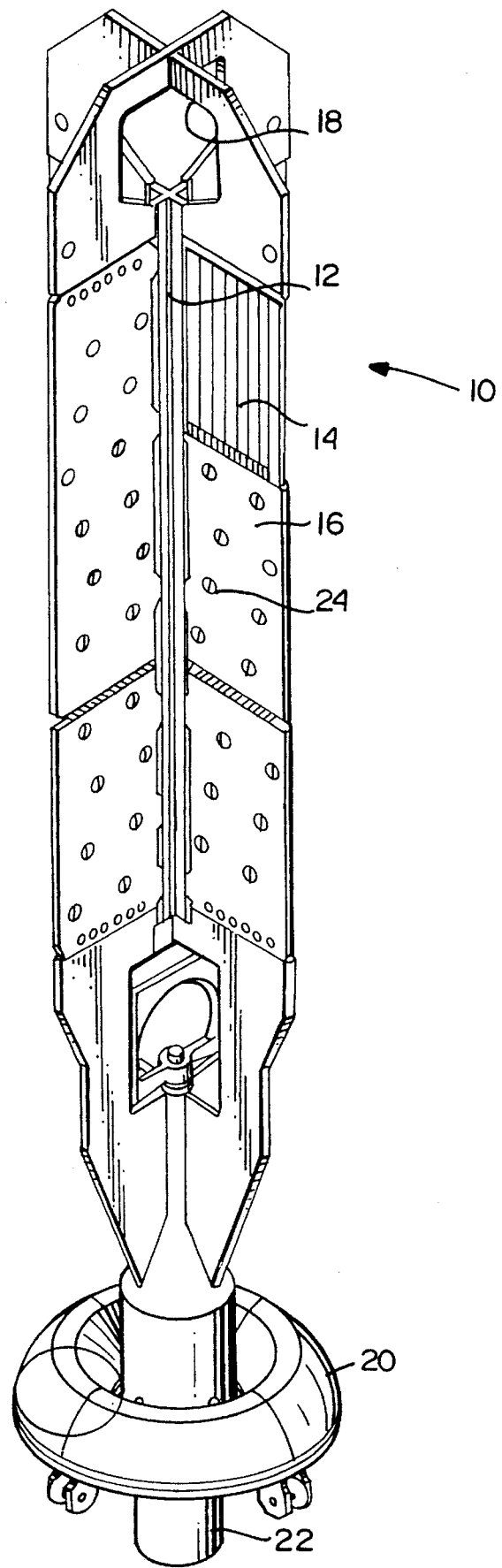
FIG. 1 is a perspective view of a control rod for a nuclear reactor and representative of a prior art control rod.

Referring now to FIG. 1, there is illustrated a representative example of a control rod, generally designated 10, according to the prior art. The control rod includes a generally cruciform-shaped, vertically extending central tie rod 12 and four wings which form continuations of the cruciform shape of the central tie rod 12. Each of the wings contains a plurality of tubes 14, for example, 84 stainless steel tubes, filled with boron carbide powder compacted to a percentage of its theoretical density. The tubes are seal-welded with end plugs on either end and act as pressure vessels to contain helium gas released by the boron-neutron capture reaction. The tubes are held in each wing by a stainless steel sheath 16 extending the full length of the tubes with the inner edges of the sheath secured by welding to the cruciform-shaped tie rod 12, the outer edge being wrapped around the outer tube. One or more hafnium tubes may also be employed in conjunction with the boron carbide-containing tubes 14. A handle 18 is provided at the upper end of the control rod, while a velocity limiter 20 and a coupling socket 22 are provided adjacent its lower end.

As those of skill in this art will appreciate, the control rod is disposed between fuel bundles arranged to have interstices in a generally cruciform shape complementary to the shape of the control rod. By vertically manipulating the control rod, the power distribution, shaping and reactivity control of the reactor can be accomplished. In the illustrated prior control rod of FIG. 1, perforations 24 are provided in the external sheathing 16 around the control rod to permit a cooling medium to flow in and about the neutron absorber tubes. Additionally, the tubes may be formed of all boron carbide or all hafnium rods or combinations of boron carbide and hafnium tubes, depending upon the circumstances of the reactor.

Figure 2:
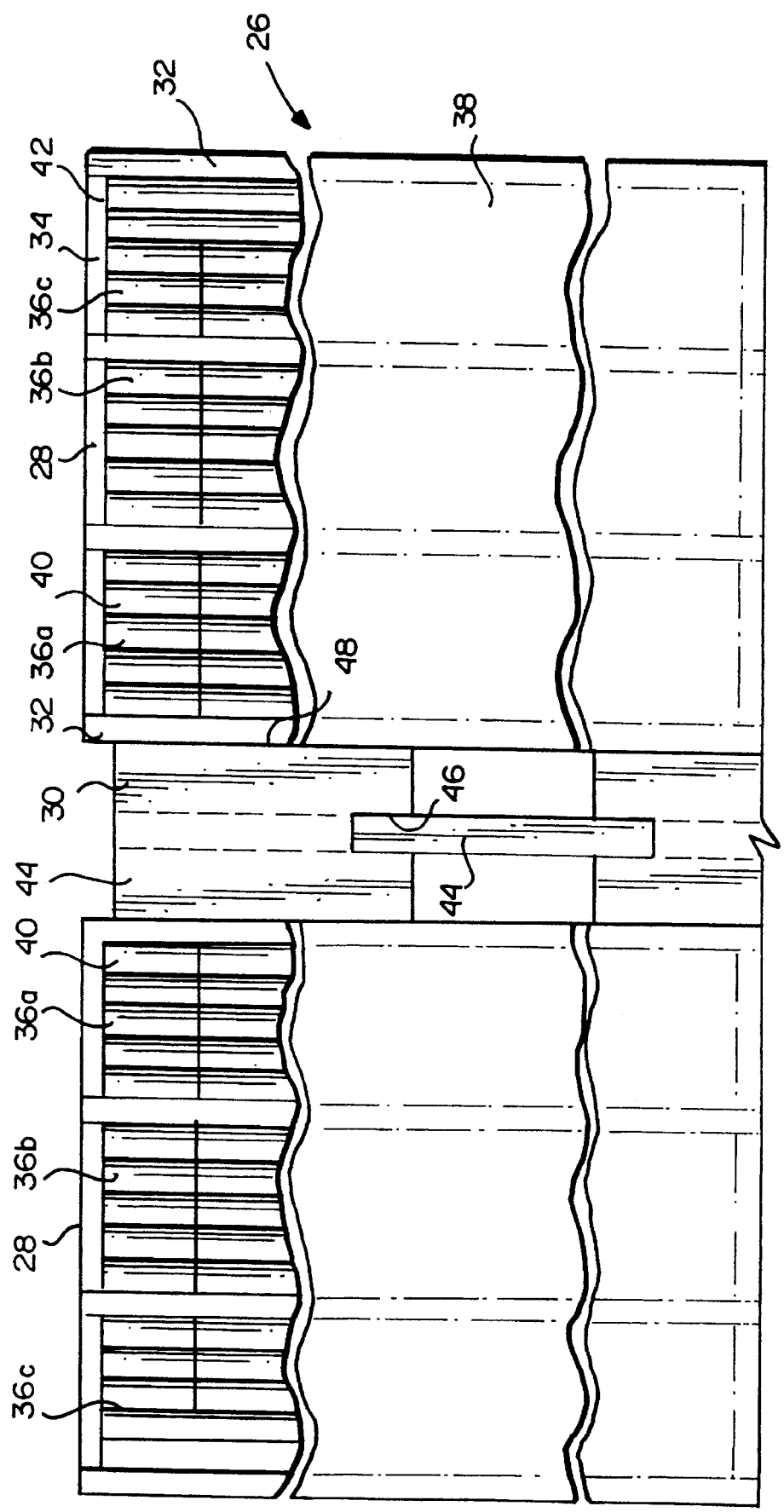
FIG. 2 is a side elevational view with portions broken out to illustrate a control rod according to the present invention.

Referring now to FIG. 2, there is illustrated a portion of a control rod, generally designated 26, constructed in accordance with the present invention. It will be appreciated that the control rod 26 is generally in a cruciform shape similarly as the previously described prior art control rod, and has wings 28 disposed at right angles to one another about a centrally disposed tie rod 30. Only two of the wings 28 lying in a common plane are illustrated in FIG. 2, it being appreciated that additional wings 28 are similarly secured to the central tie rod 30 and project to opposite sides of the illustrated wings 28 at right angles thereto.

Each wing in accordance with the present invention is formed of a plurality of vertically extending structural stiffeners or members 32 laterally spaced one from the other. Generally horizontally extending parallel structures or stiffeners 34 are disposed between the vertically oriented members 32 at opposite ends of the control rod. Alternatively, the upper and lower ends of the vertically extending members 32 may be welded to members 34 which extend the full length of each wing and thus overlie the ends of the vertical members 32 at each of the upper and lower ends. In either case, the vertically and horizontally extending members 32 and 34 form a plurality of laterally spaced, side-by-side s compartments in each wing 28 of the control rod 26. Thus, in the illustrated form, three compartments 36a, 36b and 36c are formed in each wing 28 of control rod 26. Overlying the compartments on opposite sides thereof there is sheathing 38 secured, e.g., by welding, to each of the vertical and horizontally extending members 32 and 34, respectively. The members 32 and 34 and sheathing 38, when secured to the members 32 and 34, form compartments 36 completely sealed from the surrounding environment.

Neutron-absorbing material is disposed in each of the compartments 36. For example, a plurality of capsules 40, each containing boron carbide powder, may be disposed in columnar fashion in each of the compartments 36. Thus, the capsules may be superposed one over the other end-on-end and without securement to one another or to the members 32, 34 or sheath 36. Additionally, one or more elongated tubes containing neutron-absorbing material, e.g., a hafnium rod, extending the full height of the compartments may be provided. For example, the two outermost tubes in the outermost compartments 36c of the wings 28 may comprise hafnium tubes 42 containing hafnium rods. These tubes likewise need not be secured to the members 32, 34 or sheath 36.

Figure 5:
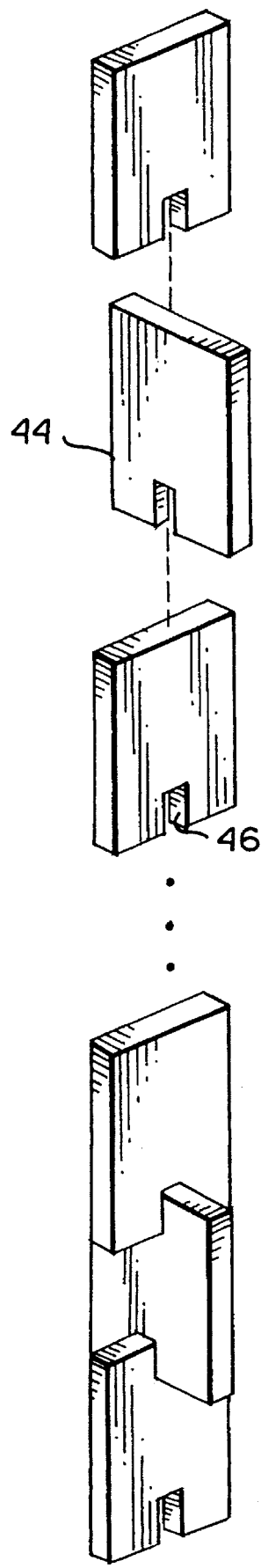
FIG. 5 is a perspective view of the central tie rod for the control rod.

As illustrated in FIGS. 2 and 5, the central tie rod comprises a plurality of vertically superposed planar plates 44, each having a centrally located slot 46 in its lower end. By alternating the planar tie rod plates 44 at right angles to one another, it will be appreciated that a central upper edge portion of an underlying tie rod planar plate may be received in the slot 46 of the next-adjacent superposed planar tie rod plate 44. Each plate has its outermost edges 48 secured as by welding to the innermost vertically extending stiffener or member 32 of a wing lying in the same plane as the planar tie rod plate 44. Thus, for example, as illustrated in FIG. 2, the upper tie rod plate 44 has its opposite edges 48 secured to the innermost members 32 of the wings 28 lying 180° one from the other. Thus, the wings 28 and the uppermost tie rod plate 44 lie in a common plane with one another and with the uppermost tie rod plate 44. The next-lower tie rod plate 44 is received in the slot 46 of the superposed tie rod plate and has its opposite edges 48 secured as by welding to the innermost members 32 of the right angularly related wings 28 lying in a common plane with one another and with the underlying plate 44. The planar tie rod plates 44 thus alternate at right angles to one another to form a generally cruciform-shaped central tie rod. Note that the tie rod plates are themselves not secured to one another and that the structural connection between the wings and the tie rod is through the vertically extending innermost members 32 of the wings 28.

The foregoing construction has been found to be advantageous in the manufacture of the control rod. Whereas previously it was necessary to weld individual rods to one another to provide for the structural integrity of the control rod, the only welding required in the present invention is the welding of the members 32 and 34 to one another and the sheathing 38 to the members 32 and 34 in conjunction with its attachment to the central tie rod. Thus, the amount of welding is very considerably reduced as compared with the magnitude of the welding necessary for prior art control rods.

Figure 3:
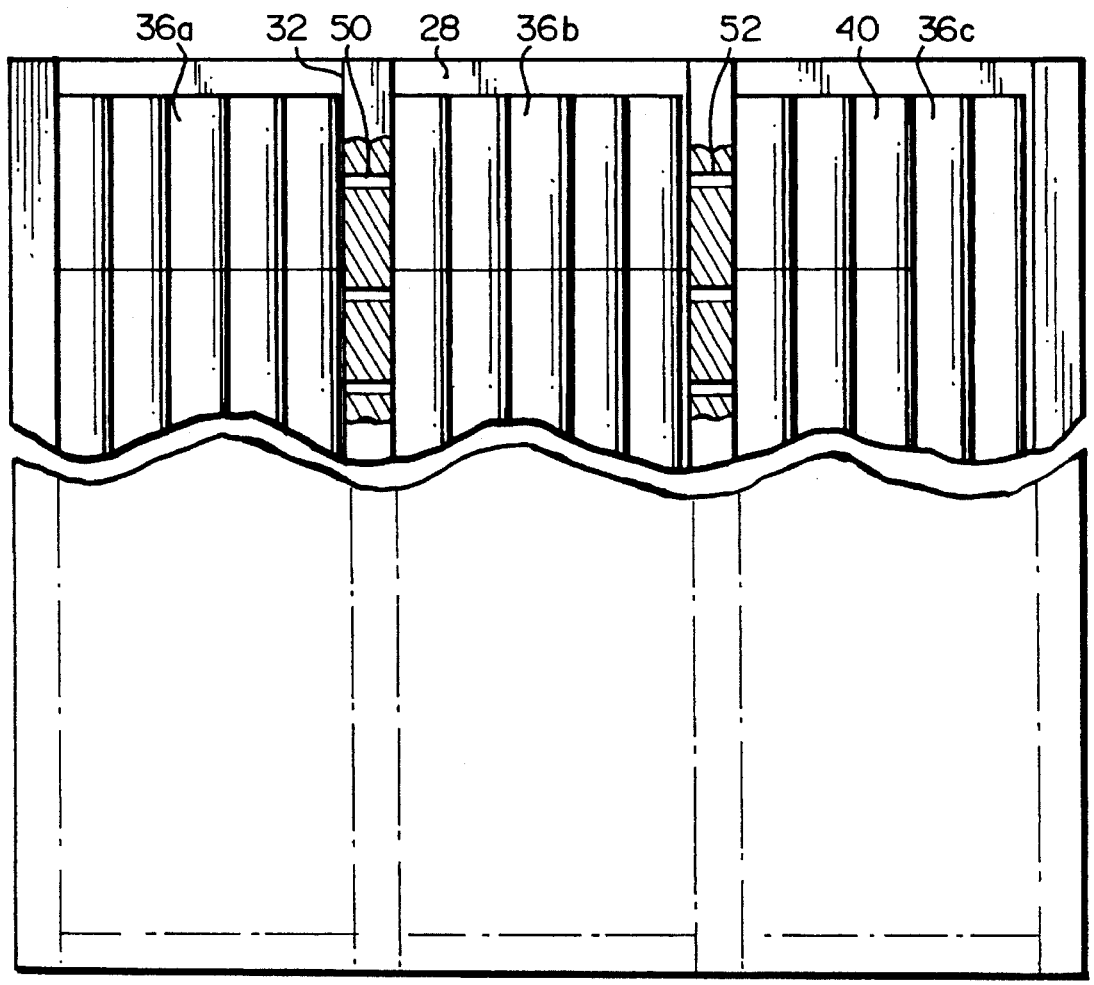
FIG. 3 is a view similar to FIG. 2 with portions broken out and in cross-section illustrating the passages through the structural members for pressure equalization.
Figure 4:
FIG. 4 is a top plan view thereof.

In another aspect of the present invention and referring to FIGS. 3 and 4, the internal vertically extending members 32 are provided with leakage openings or apertures between adjacent compartments 36. Thus, as illustrated, vertically spaced leakage openings 50 are provided through the vertical members 32, affording communication between compartments 36a and 36b. Similarly, vertically spaced leakage openings 52 are provided through the other internal vertically extending member 32, affording communication between compartments 36b and 36c. These leakage openings are particularly useful for equalizing the pressure of the helium gas generated by the boron-neutron capture reaction as between the various compartments and capsules. In this form, the boron carbide capsules 40 are provided with leakage paths through their ends such that helium gas generated by the boron-neutron reaction may leak from the capsule into the sealed compartment 36. As a consequence, the pressure within each of the compartments is substantially equalized and the boron capsules need not provide structural integrity and strength necessary to maintain the generated helium gas within the capsule under pressure. As a further consequence, the mechanical life of the control rod is extended because the pressure within the compartments would constitute the average of the pressures generated by the boron-neutron reaction in the various capsules, eliminating any need to replace a control rod as a result of high pressures developing in one of the many boron carbide capsules.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A control rod for a nuclear reactor, comprising:

a cruciform control rod body having four elongated, substantially vertically extending wings arranged generally 90° relative to one another, each wing including a plurality of elongated, generally vertically extending discrete structural members spaced from one another and discrete horizontally extending structural members adjacent opposite ends of said vertically extending members defining a plurality of vertically extending, side-by-side compartments;

a sheath disposed along opposite sides of said vertically and horizontally extending members, said structural members being welded to one another and said sheaths being welded to said structural members whereby said members and said sheath seal said compartments externally of said wing;

neutron-absorbing material disposed in each said sealed compartment; and a passage through a vertically extending member in part defining adjacent compartments enabling passage of gas under pressure generated by reaction of at least certain of the neutron-absorbing material with neutrons from one of said adjacent compartments through said passage into another of said adjacent compartments.

2. A control rod according to claim 1 wherein said neutron-absorbing material comprises boron carbide disposed in a plurality of capsules, said plurality of capsules being disposed in said compartments.

3. A control rod according to claim 2 wherein said capsules are confined within said compartments by said members and said sheaths and without structural interconnection therewith.

4. A control rod according to claim 2 wherein said neutron-absorbing material comprises hafnium.

5. A control rod according to claim 1 including a central tie rod comprised of a plurality of planar plates each secured along opposite edges to innermost vertical members of a pair of wings lying in a common plane, the plates being superposed one over the other.

6. A control rod according to claim 5 wherein said tie rod plates have a slot at one end for receiving a portion of a vertically adjacent tie rod plate whereby the tie rod plates interconnect with one another and are alternately secured to right angularly related planar extending wings.

7. A control rod for a nuclear reactor comprising a control rod body having a plurality of elongated, laterally spaced, generally vertically extending parallel discrete structural members in part defining a plurality of side-by-side compartments each containing neutron-absorbing material, discrete structural members generally right angularly related and joined to said parallel vertically extending members at opposite ends of said compartments to close said compartments in the plane thereof, a sheath on opposite sides of said discrete structural members closing the sides of said compartments, said members being welded to one another and said sheaths being welded to said members to form sealed compartments, and an opening in at least one of said members in part defining adjacent compartments enabling passage of gas under pressure generated by reaction of the neutron-absorbing material with neutrons from one of said adjacent compartments through said opening to another of said adjacent compartments to maintain said adjacent compartments under substantially equal pressure.

8. A control rod according to claim 7 wherein said neutron-absorbing material comprises boron carbide disposed in a plurality of capsules, said plurality of capsules being disposed in said compartments.

9. A control rod according to claim 8 wherein said capsules are confined within said compartments by said members and said sheath and without structural interconnection therewith.

10. A control rod according to claim 8 wherein said neutron-absorbing material comprises hafnium.

11. A control rod according to claim 7 including a central tie rod comprised of a plurality of planar plates each secured along opposite edges to innermost structural members of said plurality thereof lying in a common plane, the plates being superposed one over the other.

12. A control rod according to claim 11 wherein said tie rod plates have a slot at one end for receiving a portion of a vertically adjacent tie rod plate whereby the tie rod plates interconnect with one another and are alternately secured to right angularly related planar extending wings.

* * * * *